United States Patent

Nau et al.

[11] Patent Number: 6,078,706
[45] Date of Patent: Jun. 20, 2000

[54] QUASI-STATIC FIBER PRESSURE SENSOR

[75] Inventors: Gregory Nau, Alexandria, Va.; Dominique M. Dagenais, Chevy Chase; Frank Bucholtz, Crofton, both of Md.

[73] Assignee: The United States of America as represented by the Secretary of the Navy, Washington, D.C.

[21] Appl. No.: 09/159,566

[22] Filed: Sep. 24, 1998

[51] Int. Cl.[7] .................................................. G01B 9/02
[52] U.S. Cl. ............................................ 385/12; 356/346
[58] Field of Search .................................. 356/35.5, 345, 356/346; 385/12

[56] References Cited

U.S. PATENT DOCUMENTS

| | | | |
|---|---|---|---|
| 5,361,130 | 11/1994 | Kersey et al. | 356/345 |
| 5,416,582 | 5/1995 | Knutson et al. | 356/349 |
| 5,452,086 | 9/1995 | Bunn | 356/345 |
| 5,748,314 | 5/1998 | Kitayoshi | 356/346 |
| 5,804,453 | 9/1998 | Chen | 436/518 |

OTHER PUBLICATIONS

Rao et al.; Development Of Prototype Fiber–Optic–Based Fizeau Pressure Sensors With Temperature Compensation And Signal Recovery By Coherence Reading; J. Ltwve Tech.; vol. 12 No. 9, pp. 1685–1695; Sep. 1994.

*Primary Examiner*—Hung N. Ngo
*Attorney, Agent, or Firm*—Barry A. Edelberg; Charles J. Stockstill

[57] ABSTRACT

This invention is a quasi-static fiber pressure sensor using self-referenced interferometry based on a broadband semiconductor source which probes the pressure plate deflection within a Fabry-Perot cavity where phase is demodulated with a dual grating spectrometer providing real-time, high resolution remote measurement of pressure using optical interrogation of a deflecting pressure plate. This technique yields absolute gap measurement in real time over a wide range of gap lengths with nanometer resolution. By tailoring the pressure plate design to cover the range of gaps and deflection that can be resolved, pressure sensing with psi resolution can be obtained in a kpsig pressure range.

14 Claims, 7 Drawing Sheets

QUASI-STATIC FIBER PRESSURE SENSOR

BACKGROUND OF THE INVENTION

1. Field of the Invention

This invention pertains generally to a quasi-static fiber pressure sensor and mor articularly to a quasi-static fiber pressure sensor using self-referenced fiber spectral interferometry.

2. Description of the Related Art

Precise, real time, remote, self-calibrated measurement of quasi-static pressure is of fundamental significance to the sensing community. Remote optical measurement of pressure-induced plate deflection is often obtained via white light interferometry or dual wavelength illumination, which require a path matching demodulator for coherent addition of the beams reflected from the two sides of the gap. Those techniques suffer from several drawbacks; first, since the system infers the value of the pressure from the difference in gaps between the sensor cavity and the demodulator, one needs to keep the demodulator length free from any drift due to environmental perturbations within the resolution of the instrument. Secondly, the two paths must be either precisely matched to obtain coherent addition, or require a fine precision linear translation stage. Since white light sources do not efficiently couple into optical fibers, one typically uses LEDs or multi-mode lasers.

The problems associated with implementing dual wavelength demodulation are; first, one needs to select two sources with a predetermined wavelength difference that will cover the range of deflections and yield an unambiguous solution. In order to maintain the proper accuracy on pressure, the sources mean wavelengths must be stabilized, requiring active current and temperature laser controllers. Secondly, one needs to ensure that the coherence function of both sources is matched so that only the term corresponding to the difference in cavity lengths contributes to a phase term. Otherwise interference between the other path delayed beams will show as spurious modulation signals. This implies that the spectra of the sources cannot vary with age or feedback, within the required accuracy.

SUMMARY OF THE INVENTION

The object of this invention is to provide a device capable of real-time, high resolution remote measurements of pressure.

Another objective of this invention is to provide a device that can obtain pressure sensing with psi resolution in a kpsig pressure range.

These and other objectives are accomplished by a quasi-static fiber pressure sensor using self-referenced interferometry based on a broadband semiconductor source which probes the pressure plate deflection within a Fabry-Perot cavity where phase is demodulated with a dual grating spectrometer providing real-time, high resolution remote measurement of pressure using optical interrogation of a deflecting pressure plate. This technique yields absolute gap measurement in real time over a wide range of gap lengths with submicron resolution. By tailoring the pressure plate design to cover the range of gaps and deflection that can be resolved, pressure sensing with psi resolution can be obtained in a kpsig pressure range

DESCRIPTION OF THE PREFERRED EMBODIMENT

Figure 1:
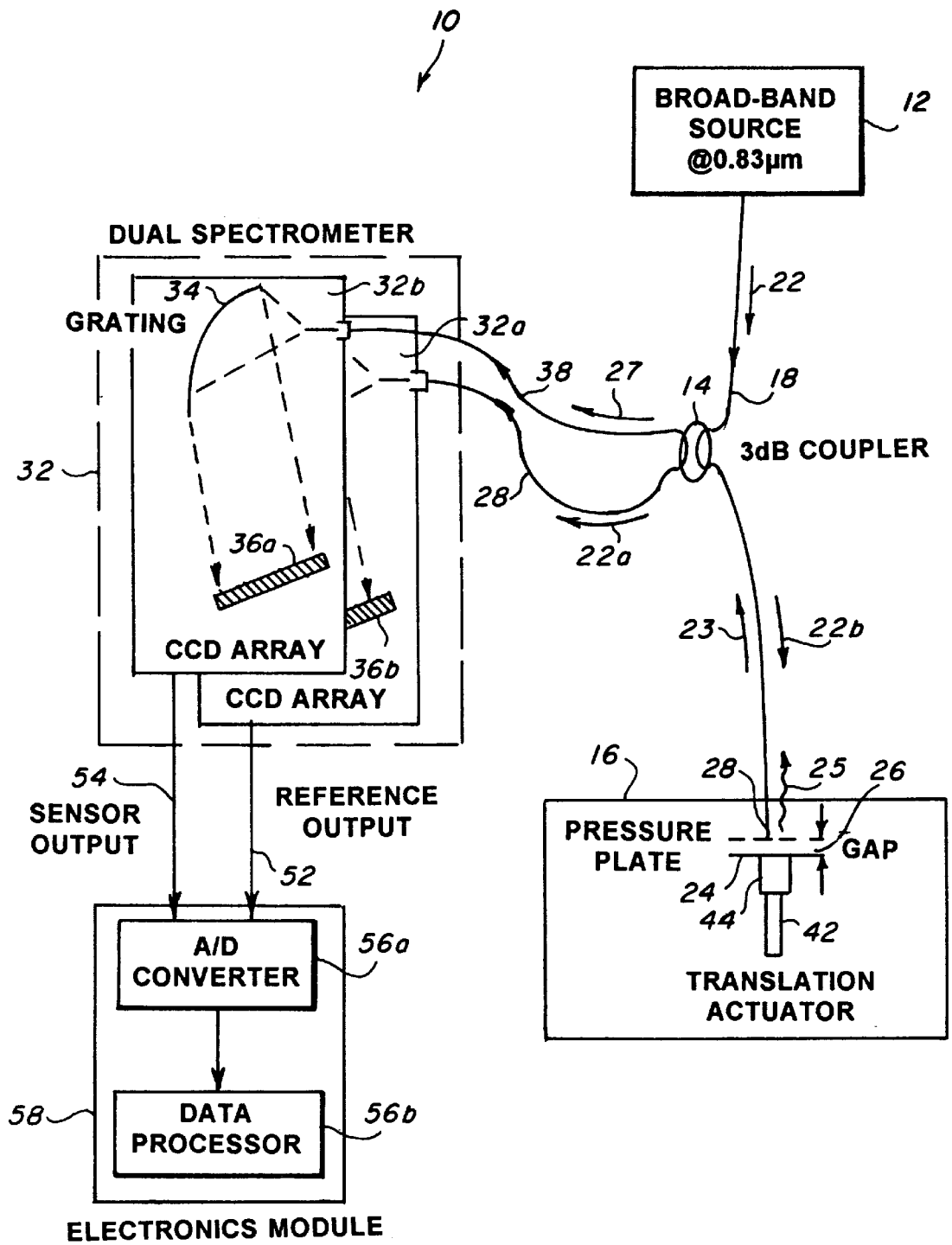
FIG. 1 shows a quasi-static fiber pressure sensor using self-reference spectral interferometry.

In a preferred embodiment of the quasi-static fiber pressure sensor using self-reference spectral interferometry 10, as shown in FIG. 1, a near Infrared (IR) source 12, such as a light emitting diode (LED) or super luminescent diode (SLD) emitting a mean wavelength in the 800–850 nm range from a pig-tailed fiber. The light-emitting diode (LED) having 200 $\mu$W output power made by MRV Technologies of Chatsworth Calif., or the SuperLuminescent Diode (SLD) with ≈1 mW output power made by EG&G Optoelectronics Sunnyvale, Calif. generates an optical light 22 is guided through a single mode optical fiber 18 of any type compatible with the output frequency of the light source 12 to a 3 dB fiber optic fused coupler 14, of any type well known to those skilled in the art, where the optical light 22 is divided into two components—a first light beam 22a directed to a reference spectrometer 32a and a second optical light signal 22b directed to a pressure sensor 16. The light 22b is reflected at the fiber/air interface 28 (by Fresnel reflection of about 4%) and at the pressure plate reflector 24 within the pressure sensor 16. The reflected light beam 23, resulting from the optical light beam 22b being reflected from the pressure plate reflector 24 is phase delayed by the round trip in the sensing gap 26 with respect to the beam 25 reflected at the fiber cleave or interface 28. The air gap 26 is formed between a cleaved fiber 28 and a reflecting glass plate 24, positioned approximately 20 to 200 $\mu$m from the fiber cleave 28. A pressure plate 24 is mounted on a translation stage 42 with piezo translation actuator (PZT) 44.

Light 23 and 25 from both reflections is collected by the fiber 18 and transmitted through the coupler 14 to form the optical light beam 27 in optical fiber 38 and applied to a spectrometer portion 32b of a dual spectrometer 32, using standard single mode fibers 18 and 38 and couplers 14 at 830 nm (typically narrow band couplers with ±10 nm bandpass). Quasi-simultaneous measurement of the source and the sensor spectra can be obtained either by using a dual visible grating spectrometer 32 on a board, such as Ocean Optics S2000, made by Ocean Optics, Inc. of Dunedin, Fla., with resolution ≈0.3 nm.

Light beam 27 is projected from the optical fiber 38 onto a high dispersion grating 34 (~1200 lines/mm) within the sensor portion 32a of the dual spectrometer 32 and reflected onto an associated charge coupled device (CCD) array detector 36a. Each pixel on the CCD 36 being responsive to an predetermined wavelength. The optical light 22a from the light source 12 and passed through the coupler 14 is directed onto a grating (similar to the grating 34) in the reference portion 32b of the dual spectrometer 32 and reflected onto an associated CCD 36b. Collecting lenses are used for improved optical efficiency in gathering light 27 and 28 onto their respective CCD arrays 36a and 36b in the spectrometers 32a and 32b.

The output distribution at the CCD array detector 36 is uniquely related to the gap 26 length. For a gap 26 of length L between the pressure plate reflector 24 and the fiber cleave 28, the phase delay seen by the reflected beam is $$\Phi = 4\pi n L/\lambda \tag{1}$$

where $\Phi$ is the phase delay, $\lambda$ the wavelength of light and L the optical gap 26. For an air index=1.000, the optical gap=physical gap where n=index of refraction at wavelength $\lambda$. Assuming that the cavity formed by these two interfaces is a low finesse Fabry-Perot (the reflection from both interfaces is small) and can be approximated to a two-beam interferometer. When the gap 26 is illuminated with a broadband light 22 of intensity $I_O(\lambda)$, the intensity obtained on each pixel of the CCD array 36a and 36b is a summation over the band of wavelengths detected, which is defined by the grating 34 dispersion and spectrometer 32 geometry. The intensity at pixel k with center wavelength $\lambda_k$ of the CCD 36a the sensor output) is then $$I(\lambda_k) = I_O(\lambda_k)(1 + \Gamma \cos(4\pi n L/\lambda_k)) \tag{2}$$

where the fringe contrast $\Gamma$ is governed by the spectral resolution at the CCD 36a and the relative intensities of the two interfering beams; the reflected beams 23 and 25 from the cleaved end of the optical fiber 28 and reflected from the pressure plate 24.

The output signals 54 and 52 from the sensor portion 36a and reference portion 36b, respectively, of the CCDs 36a and 36b, respectively of dual spectrometer 32 can be readily decoded in an analog/digital (A/D) converter 56a and electronically processed in a data processing section 56b of an electronics module 58 from the spectral pattern exhibited by the spectrometer CCD detector arrays 36a and 36b. Since the fringe contrast is defined by the spectrometer 32 geometry, path matching is not required in order to obtain a high fringe contrast at the CCDs 36a and 36b. The outputs 52 and 54 from the arrays 36a and 36b respectively, of N pixels (typically N=1024 or 2048) is then comparable to N interferometric responses from the same gap 26. Knowledge of the absolute value of the gap 26 and its respective plate 24 deflection is obtained by extraction of the phase over the complete spectrum. The spectrum shows a maximum at wavelengths for which the phase is an even number of $\pi$. Therefore, for a gap 26, L, two consecutive maxima will occur for:

$$\Phi = (M)^* 2\pi = 4\pi n L/\lambda_m \text{ and } \Phi = (M+1)^* 2\pi = 4\pi n L/\lambda_n \tag{3}$$

and the gap 26 can be estimated from subtraction, as $$L = \lambda_m \lambda_n / (2n\Delta\lambda) \text{ where } \Delta\lambda = \lambda_m - \lambda_n \tag{4}$$

The gap 26 extraction requires the knowledge of the source spectrum $I_O(\lambda)$ and the sensor spectrum $I(\lambda)$.

Figure 2:
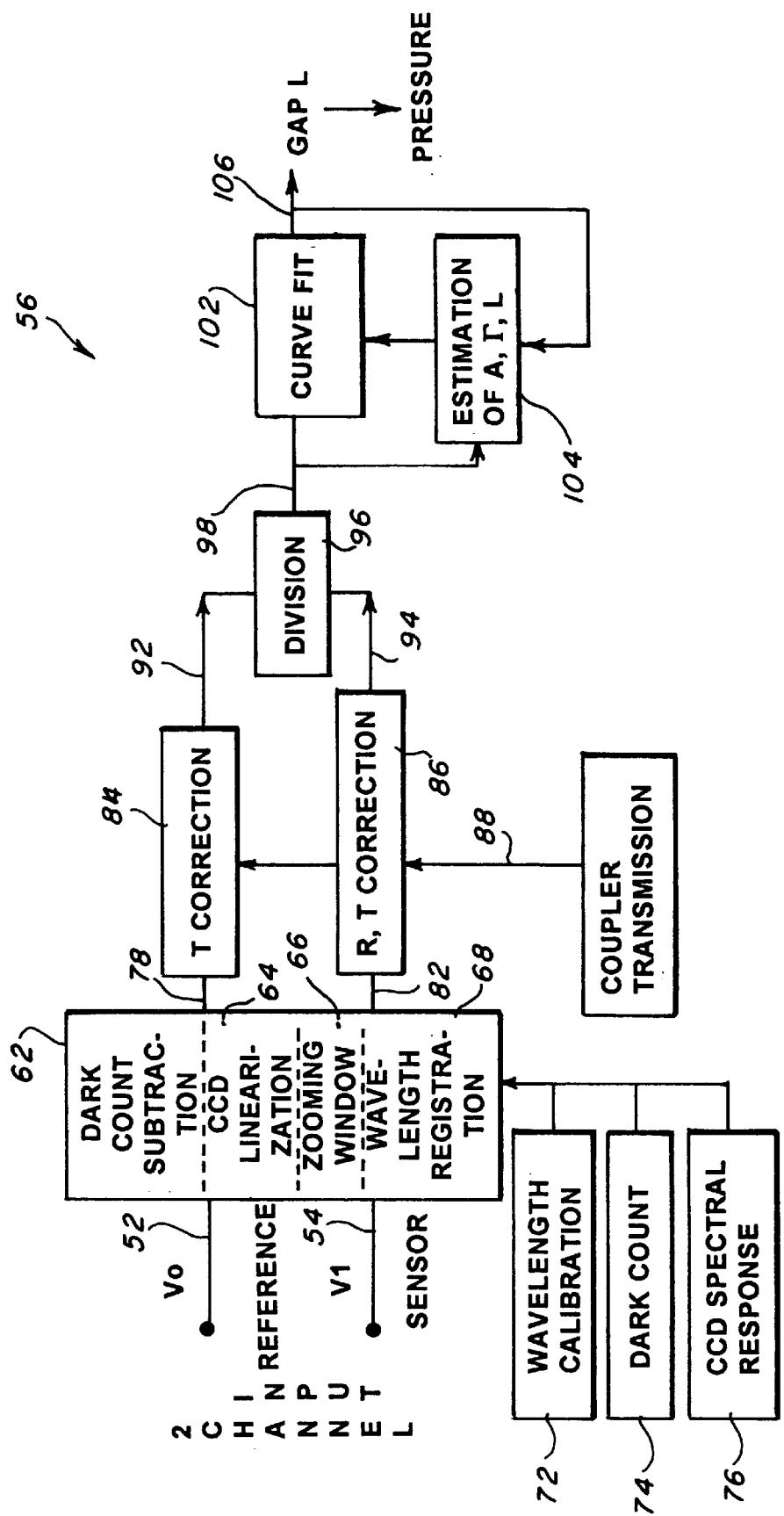
FIG. 2 shows a flow chart of a curve fitting routine.

Referring to FIG. 2, after subtraction of the CCD dark count 62, normalization to the CCD 36a and 36b response by linearization to the optical power response 64 and "zooming" 66 to highlight pertinent data by retaining only data in a window$\approx \pm 50$ nm around the source peak emitting wavelength because the CCD 36a and 36b gives an echo window which is $\approx 700$–$900$ nm, wider than the $\approx 100$ nm window which contains intensity above the dark count and that is actually used in the computations. For each pixel on the CCD 36a and 36b there is an equivalent wavelength which is registered 68 through wavelength calibration 72. Wavelength registration 68 also allows for interpolation of pixel assignments when the two CCD arrays 36a and 36b exhibit different wavelength calibration curves.

The wavelength calibration 72, dark count 74 and CCD spectral response 76 are stored in a data bank that is manually input into a memory microchip (not shown). The wavelength calibration data 72 is obtained by obtaining measurements of that portion of the wavelength with a spectroscopic lamp (not shown) such as a Mercury-Argon source. The data for the dark count 74 is obtained by making measurements with the optical light source 12 OFF, these techniques are well known to those skilled in the art. The data for the spectral response 76 is obtained from a calibration of the system using a calibrated irradiance source (not shown), such as a tungsten halogen source, utilizing techniques well known to those skilled in the art.

The input signals of $V_0$ 52 and $V_1$ 54 from the CCDs 36a and 36b are output as adjusted electrical signals 78 and 82. Because of the broadband source 12 used, the fiber coupler 14 may exhibit a variation in splitting ratio with wavelength. This will introduce a skewing between the sensor spectrum 82 that has traversed the coupler 14 twice and the reference spectrum 78 that has traversed the coupler 14 only once. This skewing can be eliminated by correcting for the coupler 14 spectral response utilizing a T corrector 84 for the reference spectra 78 and RT corrector 86 for the sensor spectrum 82. The coupler 14 response can be measured by recording the fiber 45 reflection, while blocking the pressure plate 16 back reflection, and dividing it to that of the reference source spectrum 22a. By dividing the fiber-reflected spectrum (special case of sensor spectrum 82) by the source spectrum 78 one obtains the spectral dependence of the coupler transmission, that can be folded into $I_O(\lambda)$ to linearize the output.

The gap 26, L, is determined by curve fitting 102 the sinusoidal dependence on $\lambda$ through the formula $$I_C(\lambda)/I_{OC}(\lambda) = 1 + \Gamma \cos(4\pi n L/\lambda) \tag{5}$$

Simultaneously recording the spectra of the source 22a (reference) and the gap 26 (signal) from the two fiber outputs 22a and 27 performs a self-calibration, eliminating potential errors due to source drifts.

One then obtains the ratio of sensor signal to reference source intensities:

$$P(\lambda) = A[1 + \Gamma \cos(4\pi n L/\lambda)] \tag{6}$$

The ratio of the corrected signal 92, $I_C$, to source spectra, $I_{OC}$ 94, is obtained in a divider circuit 96 which yields the divided optical signal 98, $I_{OC}/I_C$.

Curve fitting 102,$P(\lambda)$, is obtained by fitting (by estimation)104 the three parameters of Eq. (6), A (normalizing constant due to the difference in intensity between the reference and sensor beams), $\Gamma$ (fringe contrast) and L (air gap), with a (least square) iterative process. The first estimate on the parameters is obtained by finding the value and location of the central maxima and minima. From the maximum and minimum intensities, $P_{Max}$ and $P_{Min}$ one can extract $$A = (P_{Max} + P_{Min})/2$$

$$\Gamma = (P_{Max} - P_{Min})/(P_{Max} + P_{Min}) \qquad (7)$$

From the value of the wavelengths corresponding to two consecutive maxima one can estimate the gap 26 as per Eq. (4) for all maxima. Since those wavelengths correspond to a maximum in the intensity, the phase at those wavelengths should be an even number of $2\pi$, therefore the ratio of the gap 26 to wavelengths must be an integer, decreasing with increasing wavelength, yielding a mean value for the estimated gap 26.

The estimates 104 are then inserted into the algorithm performing the above curve fit 102, the iterations yield the final solutions for A, $\Gamma$ and L and the results logged in with the respective curve fit error. Any slow variation in gap 26 can then be estimated using the previous set of parameters as the start parameters for the convergence.

Figure 3:
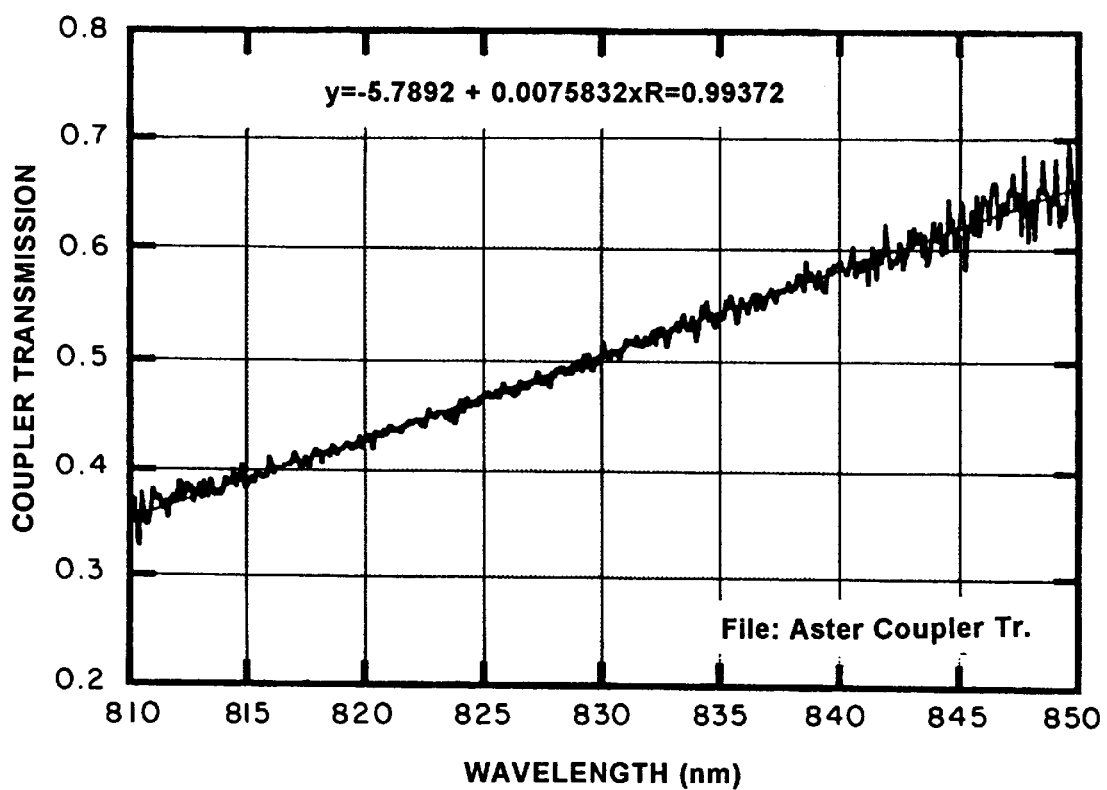
FIG. 3 shows a dependence of a coupler's transmission with wavelength.
Figure 4A:
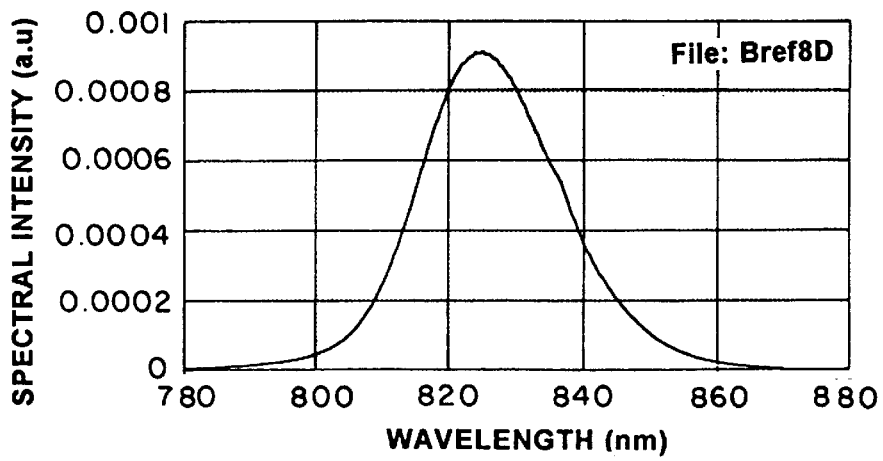
FIG. 4a shows spectral power distribution of the source reference.
Figure 4B:
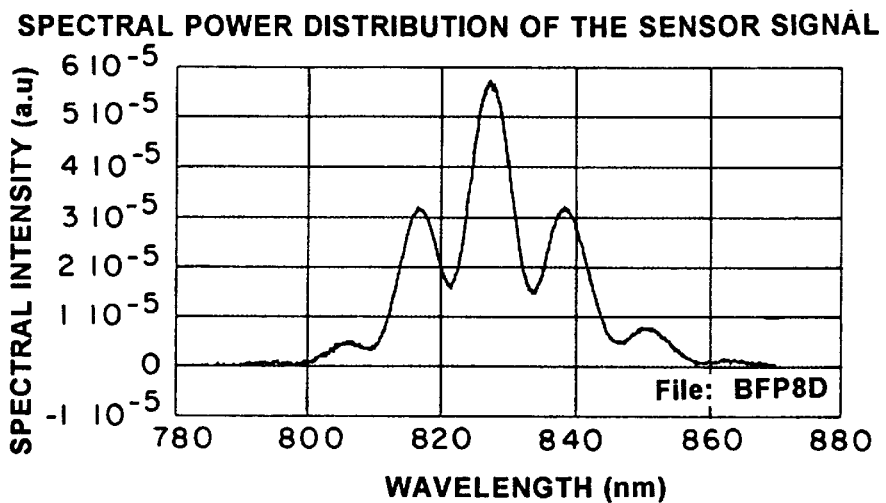
FIG. 4b shows spectral power distribution of the sensor signal for a 43 $\mu$m gap.
Figure 4C:
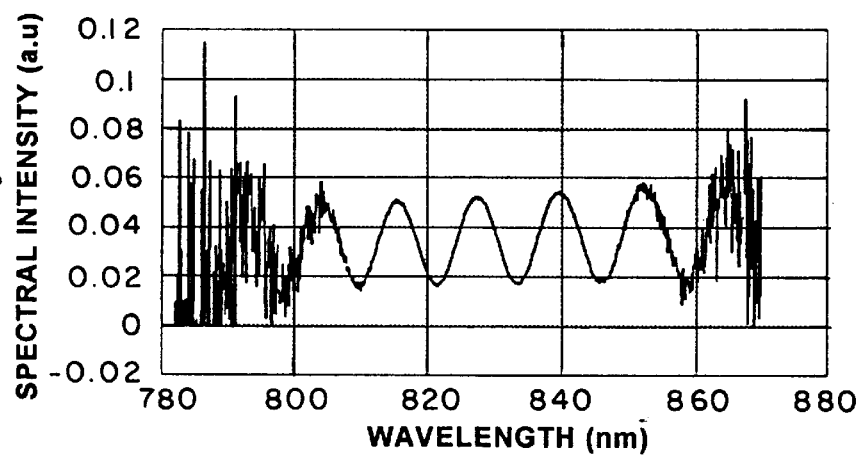
FIG. 4c shows ratio of sensor to reference after coupler correction for a 43 $\mu$m gap.

In a test device, referring again to FIG. 1, the coupler's 14 transmission was measured according to the above procedure and shows a linear dependence with wavelength around its 3 dB point at 830 nm, see FIG. 3. The fringe spectra's source spectrum (FIG. 4a), sensor spectrum (FIG. 4b), and ratio of the sensor to the source (FIG. 4e), after linearization by the coupler 14 transmission function, is shown for the test device. Comparison of FIG. 4a and FIG. 4b shows the effect of the coupler 14 narrow bandpass in the shift of the peak wavelength. After correction, the ratioed spectra exhibit the expected quasi-sinusoidal dependence on wavelength of Eq. (6).

Figure 5A:
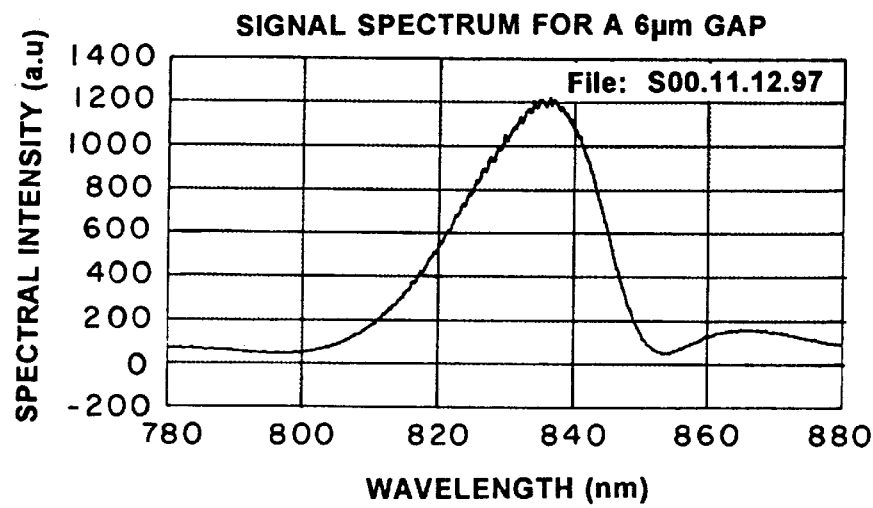
FIG. 5a shows sensor spectral distribution for a 6 $\mu$m gap.
Figure 5B:
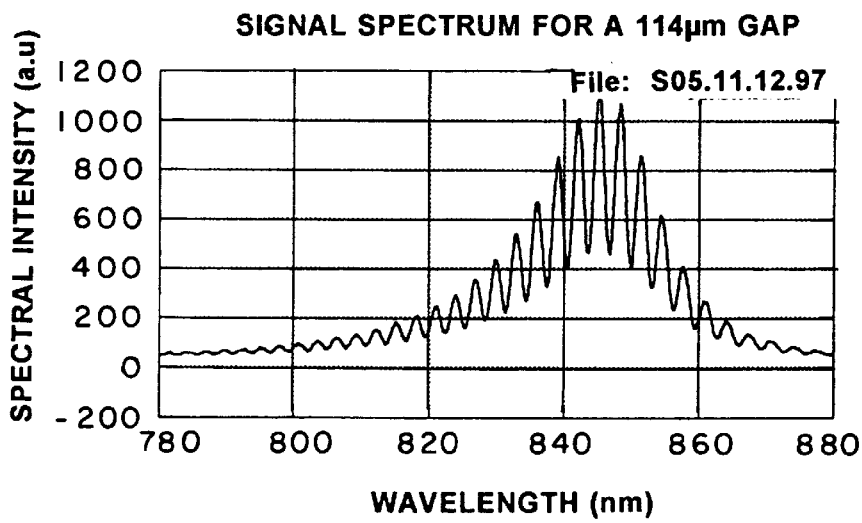
FIG. 5b shows sensor spectral distribution for a 114 $\mu$m gap.
Figure 5C:
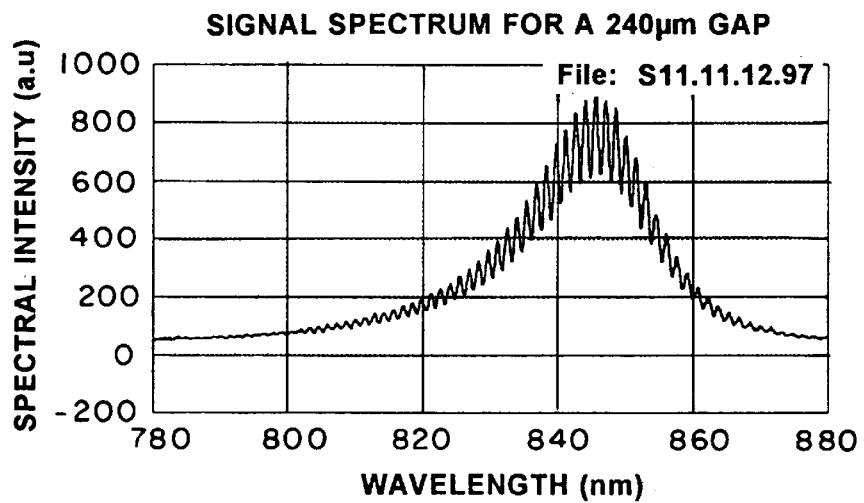
FIG. 5c shows sensor spectral distribution for a 240 $\mu$m gap.
Figure 6:
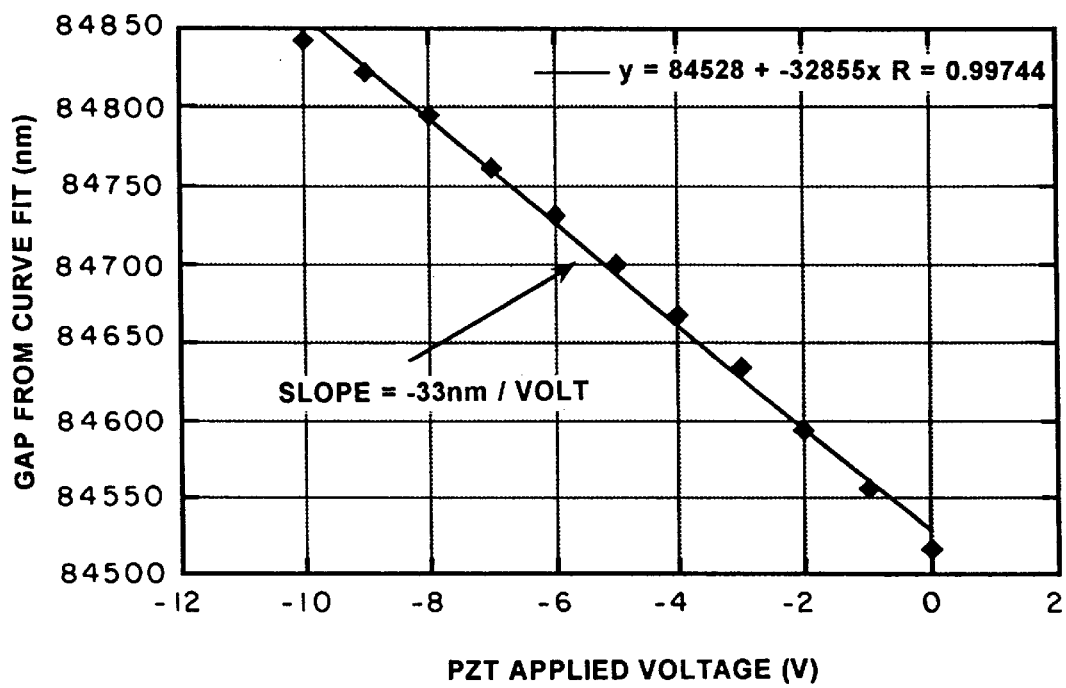
FIG. 6 shows variation in gap as a function of voltage applied to plate deflector.

Gap 26 variations between 5 $\mu$m (1 fringe) and 500 $\mu$m (87 fringes) can be measured within sub-micron precision. The variation on the sensors 10 spectra with deflection is shown in FIGS. 5a–5c, for three different gap 26 values. A calibrated piezo-ceramic transducer was used as a translator actuator or plate deflector 48 and the variation in air gap 26 measured as a function of voltage to the transducer 48 is shown in FIG. 6. This shows the very good agreement between the variation in air gap 26 due to plate deflection obtained by curve fit and calibrated displacement.

Therefore, the pressure plate 24 design can be tailored to cover the required range of gaps 26. For example, a simple circular plate with clamped edges is known to deflect under a uniform pressure load P by $$d = 3PE \, r^4 (1-\mu^2)/16Et^3 \qquad (10)$$

where E is the modulus of elasticity and $\mu$ the Poisson ratio of the plate material, r is the radius of the plate of thickness t. For a given material, r and t can be tailored to cover the pressure range of interest and achieve high range and resolution in a remote, all optical fiber sensor.

Since the optical system measures the phase delay seen by the light traveling through the Fabry-Perot cavity, absolute gaps 26 or variations in gap 26 due to other physical parameters can also be measured using the same sensing techniques. Examples of parameters that can be detected from measurement of the change in gap 26 are strain, temperature (via thermal expansion), magnetic and electric field (via magnetostriction or piezo electricity), chemical reaction, etc. For example, if a pressure plate 24 exhibits a temperature dependent deflection, such system can be implemented to simultaneously measure the temperature dependence of the plate deflection and compensate for thermal effects on the plate.

Although the algorithm is shown in the case of a two-beam interferometer (assuming a low reflectivity cavity) with cosine dependence on the air gap 26. L, the same procedure can be used for a more general Fabry-Perot cavity, if multiple reflections are present at the air gap 26, using the known Fabry-Perot relationship between intensity and air gap.

Figure 7:
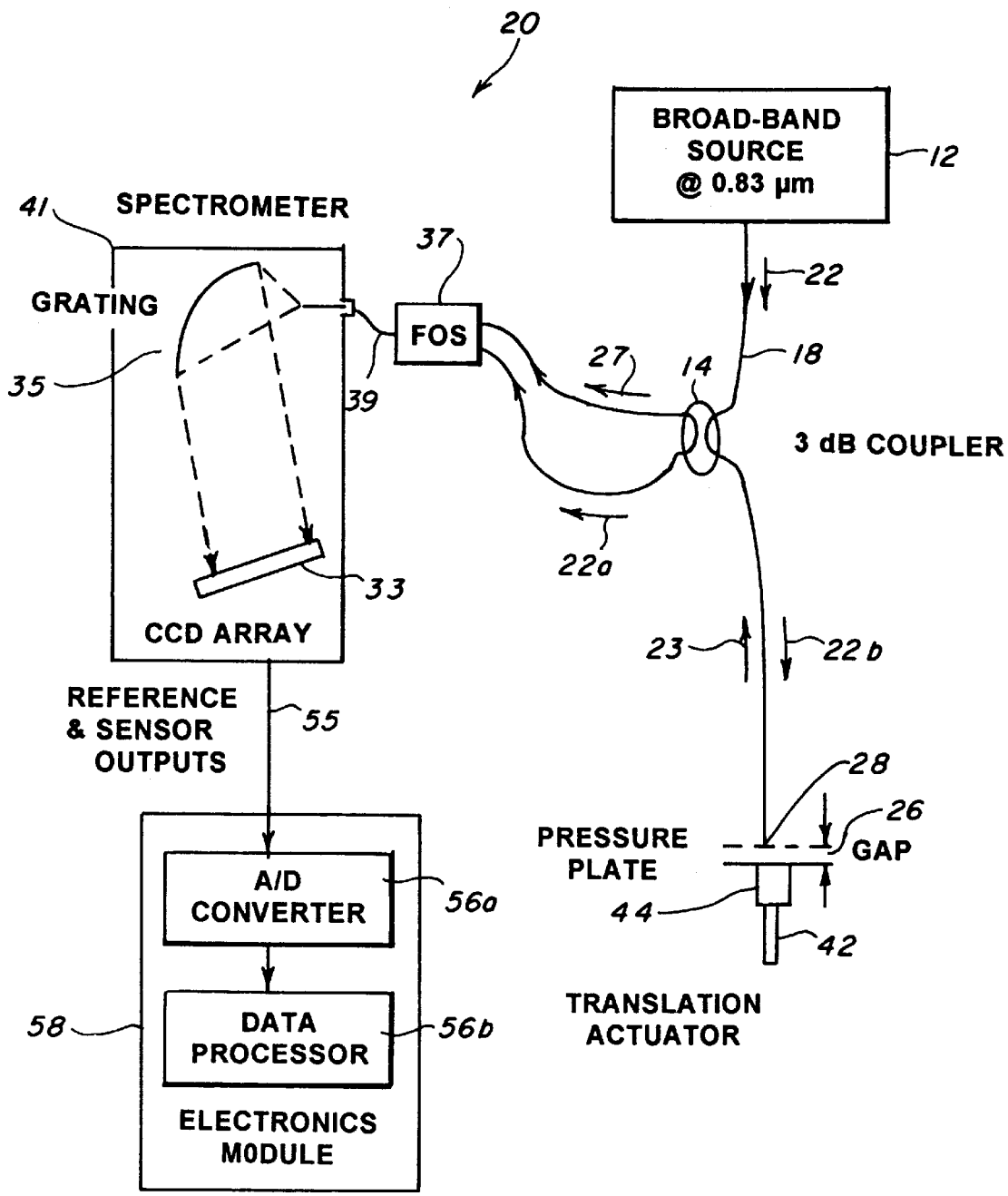
FIG. 7 shows a spectral interferometer sensor with a fiber optic switch and a single spectrometer.

In another preferred embodiment, referring again to FIG. 7, a spectral interferometer 20, utilizing a mechanical fiber optic switch 37, such as those made by E-Tek Dynamics of San Jose, Calif. combined with a single grating spectrometer 41, such as the Ocean Optics S2000 m is utilized to obtain a quasi-simultaneous measurement of the source and the sensor spectra. The operation is similar to the described embodiment shown in FIG. 1. The exception is that the single grating spectrometer 41 with the mechanical fiber optic switch 37 is utilized instead of the dual-grating spectrometer The fiber optic switch 37 takes the optical inputs of the source and sensor optical signals 22a and 27 and selectively impinges them onto a single grating 35 in the spectrometer 41 where they are reflected onto a single charge coupled device (SCCD) 33. An electromagnetic output 55 from the SCCD 33 is applied to an analog-to-digital converter 56a, split into its respective source and sensor components, utilizing techniques well known to those skilled in the art and processed through a data processor 56b in an electronics module 58 similar to that previously described in reference to FIG. 2.

This invention offers high sensitivity as a result of the selection of a single mode fiber having a small core size (about 5 $\mu$m), combined with a high resolution spectrometer grating; yielding a high spectral resolution (i.e., better than 0.3 mm). The device is highly efficient due to the selection of a source wavelength at 830 nm combined with a low noise CCD array and is self-referenced, as a simultaneous reading of the reference spectrum eliminates any source drifts. A calibration source integrated into the fiber-optic switch maintains the spectrometer calibration. Curve fitting the normalized spectrum makes use of the complete spectral data and yields a resolution of a fraction of a pixel, yielding a very precise value for the gap, hence the pressure, The device offers a large dynamic range and can extract the value of a gap from a spectrum with about one fringe to 100 fringes, which allows for a large range of pressure-induced deflections, hence pressures. The combined high resolution and high accuracy sensing is obtained in a simple, compact, alignment insensitive package, due to the selection of an all-fiber design.

The device can perform remote detection due to the low-loss waveguiding of the light in a single mode fiber, and the fact that the spectral modulation information it contains is essentially immune from potential environmental disturbances on the lead fiber. The sensing technique can be applied to other measurements of small gaps or moving reflecting surfaces.

Although the invention has been described in relation to an exemplary embodiment thereof, it will be understood by those skilled in the art that still other variations and modifications can be affected in the preferred embodiment without detracting from the scope and spirit of the invention as described in the claims.

What is claimed:

1. A sensor comprised of:

a single source of optical light impinged onto a pressure plate across an air gap for interrogating deflections of a deflecting pressure plate across an air gap;

means for measuring the optical lights phase shift resulting from the interrogation of the deflections of the pressure plate and the phase of a reference optical light signal, outputting an analog electrical signal representing the phase of the sensor and reference optical light signals; and means for normalizing the phases of the sensor optical light signal to the reference optical light signal to determine absolute dimensions of the air gap between the fiber signal and the pressure plate.

2. A sensor comprised of:

a single source of optical light;

means for dividing the single optical light so as to produce a sensor and reference optical light signal;

said sensor optical light interrogating position of a deflecting pressure plate across an air gap;

means for measuring the sensor optical lights phase shift resulting from the interrogation of the deflection of the pressure plate and outputting an analog electrical signal representing the phase of the sensor optical light signal;

means for measuring the power distribution of the reference optical light signal and outputting an analog electrical signal representing the power distribution of the reference optical light signal; and means for normalizing the phases of the sensor optical light signal to the reference optical light signal to determine absolute dimensions of the air gap between the fiber signal and the pressure plate and plate deflection.

3. A sensor, as in claim 2, further comprising a single mode optical fiber to guide the sensor and reference optical lights is a single mode optical fiber.

4. A sensor, as in claim 2, wherein the source of optical light is a fiber pig-tailed broadband semiconductor optical light source.

5. A sensor, as in claim 4, wherein the optical light source is a light emitting diode.

6. A sensor, as in claim 4, wherein the optical light source is a superluminescent diode.

7. A sensor, as in claim 2, wherein the means for measuring the sensor optical light power and phase shift resulting from the interrogation of the deflections of the pressure plate and means for measuring the power of the reference optical light signal is a high resolution dual visible grating spectrometer.

8. A sensor, as in claim 2, wherein the means for dividing the optical light so as to produce a sensor and reference optical light signal is an optical coupler.

9. A sensor, as in claim 2, further comprising a fiber optic switch and a single grating spectrometer.

10. A sensor comprised of:

a single source of optical light;

a coupler for dividing the optical light so as to produce a sensor and reference optical light signal;

a single mode optical fiber to guide the sensor and reference optical lights is a single mode optical fiber, said sensor optical light interrogating deflections of a deflecting pressure plate across an air gap;

a dual visible grating spectrometer for measuring the reference optical light and the sensor optical light phase shift resulting from the interrogation of the deflections of the pressure plate and outputting an analog electrical signal representing the spectral distribution of the sensor and reference optical light signals;

means for converting the analog sensor and reference electrical signal into a digital signal; and means for normalizing the spectrum of the digital sensor electrical signal and the reference digital electrical signal to determine absolute dimensions of the air gap between the fiber and the pressure plate and infer plate deflection.

11. A sensor comprised of:

a single source of optical light;

a coupler for dividing the optical light so as to produce a sensor and reference optical light signal;

a single mode optical fiber to guide the sensor and reference optical lights is a single mode optical fiber, said sensor optical light interrogating deflections of a deflecting pressure plate across an air gap;

a mechanical fiber optic switch;

a single grating spectrometer for measuring the spectal distribution of the reference optical light and the sensor optical light phase shift resulting from the interrogation of the deflections of the pressure plate and outputting an analog electrical signal representing wavelength power distribution of the sensor and reference optical light signals;

means for converting the analog sensor and reference electrical signal into a digital signal; and means for normalizing the phase of the digital sensor electrical signal and to the reference digital electrical signal to determine absolute dimensions of the air gap between the fiber and the pressure plate and infer pressure plate deflection.

12. A sensor comprised of:

a semiconductor light source producing a single optical light;

a coupler dividing the single optical light so as to produce a sensor and reference optical light signal;

said sensor optical light interrogating deflections of a deflecting pressure plate across an air gap;

a spectrometer for measuring the sensor optical lights phase shift resulting from the interrogation of the deflections of the pressure plate and measuring the phase of the reference optical light signal and outputting an analog electrical signal representing the wavelength distribution of the sensor and reference optical light signals;

a converter for converting the analog sensor and reference electrical signal into a digital signal; and a computer normalizing the phases of the sensor optical light signal to the reference optical light signal to determine dimensions of the air gap between the fiber and the pressure plate.

13. A method remote measurement of parameters comprising the steps of:

impinging a single source of optical light onto a pressure plate across an air gap for interrogating deflections of a deflecting pressure plate across an air gap;

measuring the optical light phase shift resulting from the interrogation of the deflections of the pressure plate and a reference optical light signal, outputting an analog electrical signal representing the phase of a sensor and the reference optical light signals; and normalizing the phases of the sensor optical light signal to the reference optical light signal to determine absolute dimensions of the air gap between a fiber and the pressure plate.

14. A method for remote measurement of parameters comprising the steps of:

generating a single source of optical light;

dividing the single optical light so as to produce a sensor and reference optical light signal;

interrogating deflections of a deflecting pressure plate across an air gap with the sensor optical light;

measuring the sensor optical light phase shift resulting from the interrogation of the deflections of the pressure plate and outputting an analog electrical signal representing the phase of the sensor optical light signal;

measuring the reference optical light signal and outputting an analog electrical signal representing the wavelength distribution of the reference optical light signal; and normalizing the phases of the sensor optical light signal to the reference optical light signal to determine absolute dimensions of the air gap between a fiber and the pressure plate.

* * * * *